United States Patent
Erez et al.

(10) Patent No.: US 11,677,655 B2
(45) Date of Patent: Jun. 13, 2023

(54) AUTOMATIC COMPLETION OF NETWORK VIRTUAL MODEL

(71) Applicant: Skybox Security Ltd., Herzliya (IL)

(72) Inventors: Guy Erez, Herzliya (IL); Anat Mualem, Herzliya (IL); Alon Samra, Herzliya (IL)

(73) Assignee: SKYBOX SECURITY LTD., Herzliya (IL)

( * ) Notice: Subject to any disclaimer, the term of this patent is extended or adjusted under 35 U.S.C. 154(b) by 0 days.

(21) Appl. No.: 17/305,388

(22) Filed: Jul. 6, 2021

(65) Prior Publication Data
US 2023/0014992 A1    Jan. 19, 2023

(51) Int. Cl.
*H04L 45/02* (2022.01)
*H04L 45/50* (2022.01)

(52) U.S. Cl.
CPC .............. *H04L 45/02* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 2009/0307772 A1* | 12/2009 | Markham | H04L 41/142 726/22 |
| 2013/0311160 A1* | 11/2013 | Cowie | H04W 40/20 703/13 |
| 2018/0077182 A1* | 3/2018 | Sartran | H04L 43/12 |
| 2021/0359941 A1* | 11/2021 | Byrapura Doddegowda | H04L 45/745 |

* cited by examiner

*Primary Examiner* — Xavier S Wong
(74) *Attorney, Agent, or Firm* — Reches Patents (57) ABSTRACT

A method for providing an automatically enhanced model of one or more networks, the method may include (a) determining missing next hop points; (b) finding multiple linkable pairs of relevant network elements interfaces, wherein a relevant network element interface is associated with one of the missing next hop points; and virtually linking relevant first network element interfaces of the multiple linkable pairs and the relevant second network element interfaces of the multiple linkable pairs to provide the automatic enhanced model of the one or more network. The virtually linking may include virtually adding one or more artificial network elements between the relevant first network element interfaces of the multiple linkable pairs and the relevant second network elements interfaces of the multiple linkable pairs.

24 Claims, 4 Drawing Sheets

Initial model of one or more networks 202

Model metadata regarding network elements of the one or more networks and routing rules information of the network elements of the one or more networks 204

Missing next hops 206

ABIs of missing next hops 208

Artificial network elements 210

Vulnerability scanner results 212

Network elements 214

Automatically enhanced model 216

FIG. 3

AUTOMATIC COMPLETION OF NETWORK VIRTUAL MODEL

BACKGROUND

Network security experts and administrators are tasked with verifying that communication within their network is done in a secure way. A major factor in their ability to carry out the various aspects of their role is understanding the network connectivity.

According the OSI model of communication networks, communication between nodes in the network is built in layers, where each layer's connectivity is dependent on the connectivity of the lower layers.

To fully understand a network connectivity, one must have complete understanding of its Layer 3 connectivity, the network layer (L3 for short). L3 is responsible for the transfer of packets between networks using the Internet Protocol suite (IP) networks.

IP Routing is responsible for forwarding packets between nodes. Routing is done by network devices, most known as Routers.

Each network device is connected to various segments of the network via interfaces. An interface has a unique IP that belongs to the IP ranges of the network it's part of. In addition, the network device contains a routing table, which is a set of rules, aka Routing Rules. The routing table determines the next step in the routing of a packet as follows:

```
Given a destination IP address, D, and network prefix, N:
if ( N matches a directly connected network address )
Deliver datagram to D over that network link;
else if ( The routing table contains a route for N )
Send datagram to the next-hop address listed in the routing table;
else if ( a default route exists )
Send datagram to the default route;
else
Send a forwarding error message to the originator;
```

One of the ways to understand the network connectivity is to build a Network Virtual Model (Virtual Model for short). The network virtual model is a graph that describes the network topology. Every network device is modeled as a node in the graph with all its network related components, especially interfaces and routing rules. Every network is also modeled as a node. Edges in the graph represent connectivity: An edge between a network device and a network represents connectivity between the network device interface and the network. With the graph, one can simulate the flow of an IP packet from its source to its target node, by starting at the source node, consulting the routing rules and following the edge to the next hop till the target node is reached.

For a successful simulation of IP packets routing between node A and node B in the virtual model, it is crucial to model all the routing devices that are involved in forwarding traffic between them. In case a next-hop address appears in a routing table, but that device is missing from the virtual model, the simulation will fail. Such an entry in a routing table is called a "Missing Next Hop Entry".

In a network that may include thousands and even tens of thousands of network devices, it is an extremely time consuming and error prone process to obtain the routing information of every network device to achieve fully connected model the network. In most cases, security experts and administrators will have to settle with a partial modeling of network devices leading to partial/limited ability to simulate traffic on the model. In case of a small number of missing next-hop entries and with deep knowledge of the customer network it is possible to manually connect parts of the network. However, in most real network scenarios this effort is inaccurate and/or impractical.

There is a growing need to provide an efficient solution to the missing next hop problem.

SUMMARY

There may be provided systems, methods and computer readable medium as illustrated in the specification.

There may be provided a method for providing an automatically enhanced model of one or more networks, the method may include determining missing next hop points based on model metadata regarding network elements of the one or more networks and routing rules information of the network elements of the one or more networks; finding multiple linkable pairs of relevant network elements interfaces, wherein a relevant network element interface may be associated with one of the missing next hop points; wherein each linkable pair may include (a) a relevant first network element interface associated with a first missing next hop, and (b) a relevant second network element associated with a second missing next hop; wherein the relevant first network element interface may be reachable from the relevant second network element interface; wherein the relevant second network element interface may be reachable from the relevant first network element interface; and virtually linking relevant first network element interfaces of the multiple linkable pairs and the relevant second network element interfaces of the multiple linkable pairs to provide the automatic enhanced model of the one or more network; wherein the virtually linking may include virtually adding one or more artificial network elements between the relevant first network element interfaces of the multiple linkable pairs and the relevant second network elements interfaces of the multiple linkable pairs.

The method may include determining one or more security parameters of the one or more networks by utilizing the automatically enhanced model of the one or more networks.

The determining may include a propagation of an attack through the one or more networks, based on the automatically enhanced model.

The method may include assigning one artificial network element per linkable pair of the multiple linkable pairs.

The method may include assigning less artificial network elements than a number of the multiple linkable pairs.

The virtually linking may include amending routing rules of one or more relevant network elements interfaces to point to the one or more artificial network elements.

The method may include finding a region of the one or more networks in which in-region routing may be not of interest, and modeling the region by at least one artificial network element.

The region may be a multiprotocol label switching (MPLS) network.

The method may include obtaining vulnerability scanner results indicative of one or more vulnerable network assets, wherein the one or more vulnerable network assets may be connected to at least one network, and linking the at least one network to at least one router of the one or more networks via at least one artificial network element.

The virtually linking may include solving conflicts between routing rules of linked network elements.

The solving of the conflicts may include solving conflicts related to default routing rules of network elements of a linkable pair that may be linked via a single artificial network element.

The one or more artificial network elements may include routers, firewalls, switches, load balancers or any other routing capable device.

There may be provided a non-transitory computer readable medium for providing an automatically enhanced model of one or more networks, the non-transitory computer readable medium may include determining missing next hop points based on model metadata regarding network elements of the one or more networks and routing rules information of the network elements of the one or more networks; finding multiple linkable pairs of relevant network elements interfaces, wherein a relevant network element interface may be associated with one of the missing next hop points; wherein each linkable pair may include (a) a relevant first network element interface associated with a first missing next hop, and (b) a relevant second network element associated with a second missing next hop; wherein the relevant first network element interface may be reachable from the relevant second network element interface; wherein the relevant second network element interface may be reachable from the relevant first network element interface; and virtually linking relevant first network element interfaces of the multiple linkable pairs and the relevant second network element interfaces of the multiple linkable pairs to provide the automatic enhanced model of the one or more network; wherein the virtually linking may include virtually adding one or more artificial network elements between the relevant first network element interfaces of the multiple linkable pairs and the relevant second network elements interfaces of the multiple linkable pairs.

The non-transitory computer readable medium may store instructions for determining one or more security parameters of the one or more networks by utilizing the automatically enhanced model of the one or more networks.

The non-transitory computer readable medium wherein the determining may include a propagation of an attack through the one or more networks, based on the automatically enhanced model.

The non-transitory computer readable medium may store instructions for assigning one artificial network element per linkable pair of the multiple linkable pairs.

The non-transitory computer readable medium may store instructions for assigning less artificial network elements than a number of the multiple linkable pairs.

The virtually linking may include amending routing rules of one or more relevant network elements interfaces to point to the one or more artificial network elements.

The non-transitory computer readable medium may store instructions for finding a region of the one or more networks in which in-region routing may be not of interest, and modeling the region by at least one artificial network element.

The region may be a multiprotocol label switching (MPLS) network.

The non-transitory computer readable medium may store instructions for obtaining vulnerability scanner results indicative of one or more vulnerable network assets, wherein the one or more vulnerable network assets may be connected to at least one network, and linking the at least one network to at least one router of the one or more networks via at least one artificial network element.

The virtually linking may include solving conflicts between routing rules of linked network elements.

The solving of the conflicts may include solving conflicts related to default routing rules of network elements of a linkable pair that may be linked via a single artificial network element.

The one or more artificial network elements may include routers, firewalls, switches, load balancers or any other routing capable device.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be a method for enhancing a model of one or more networks. The one or more networks may include any type of network and of any scale—wireless network, wired network, wide area network, local area network, the Internet, an international network. The one or more networks may include any number of networks.

The method is highly efficient, and may facilitate a security analysis of one or more networks—even when such an analysis was impractical (at an absence of the method). The method provides a more accurate model of the one or more networks—especially when a large number of missing next hops exists (for example thousands of missing next hops that may lead to millions of possible connections)—and there is no practical way to link between the missing next hopes. The method also enables to integrate the outcome of vulnerability scans to the model of the one or more networks—thus providing an accurate model when such model could not have been made when using prior art methods.

Given n network devices modeled with their routing tables, of which one or more devices are with missing next hop entries, it is possible to model artificial routers, that will simulate correctly the routing done between the given network devices, even though the actual network devices that perform this routing were not modeled.

There may be provided an iterative process that checks, for each pair of missing next hop points—whether they can be linked to each other.

The term interface may be a port, a part of a port, multiple ports, a socket, or any communication interface.

An Addresses Behind Interface (ABI) includes all addresses that can be reached through missing next hop.

To calculate ABI on a specific network device and for a specific missing next hop, one should go over all the routing rules that point to that hop and sum all the addresses together.

For example, suppose the router A with interface 8.8.8.1 has the following routing rules:
A—(1.1.1.0/24, 8.8.8.8)
B—(2.2.2.0/24, 8.8.8.8)
C—(3.3.3.0/24, 7.7.7.7)
D—(4.4.4.0/24, 8.8.8.8)
Where 8.8.8.8 is a missing next hop.

The ABI of interface 8.8.8.1 for missing next hop 8.8.8.8 will be the sum of the destination of rules A, B and D, which is 1.1.1.0/24, 2.2.2.0/24, 4.4.4.0/24. Note that routing rule C is not included, because it points to a different next hop (7.7.7.7).

The method may calculate the ABI of every missing next hop on every network device.

Assuming a first missing next hop of a first network element and a second missing next hop of a second network element—they may form a linkable pair if ABI (first missing next hop) includes the second network element and ABI (second missing next hop) includes the first network element.

To decide if to virtually link two routers with a virtual router, the method should perform some scanning—for example scan half of the possible pairs and see if the condition is fulfilled. Only half of the pairs should be checked, because if (router1, router2) was checked, there is no need to check (router2, router1).

An example of a method—R is a router, H is a missing next hop:

For every network device R with routing entries $(D_1, H_1) \ldots (D_n, H_n)$
  a. For every $H \in H_i$ where H is missing next hop:
    i. Let $ABI_{R,H} = \Sigma_{D_j}$ ADDRESSES CAN BE ROUTED OR ACCESSED VIA MISSING NEXT HOP Where $H_j = H$
    ii. Let $N_{R,H}$ be the network connected to R which supposed to contain the next hop H
    iii. Let $I_{R,H}$ be the IP of the interface of router R that points to $N_{R,H}$
  b. For every $ABI_{R_1,H_1}$ and $ABI_{R_2,H_2}$:
    i. In case $I_{R_1,H_1} \in ABI_{R_2,H_2}$ and $I_{R_2,H_2} \in ABI_{R_1,H_1}$ then:
    ii. Model a virtual router C with interfaces of IP $H_1$ and $H_2$ that connects $N_{R_1}$ and $N_{R_2}$ respectively
    iii. For every routing entry (D, H) in router $R_1$ where $H = H_1$ model an entry $(D, I_{R_2,H_2})$
    iv. For every routing entry (D, H) in router $R_2$ where $H = H_2$ model an entry $(D, I_{R_1,H_1})$ Notation x.x.x.x is an IPv4 address (see—for example—https://en.wikipedia.org/wiki/IPv4).

x.x.x.x/y is CIDR notation for the range of IP addresses belonging to a network with mask y. For example, 1.1.1.0/24 means the addresses 1.1.1.0-1.1.1.255.

Input

There are two routers: $R_1$ and $R_2$
$R_1$ has an interface 1.1.1.1 and points to network 1.1.1.0/24.
$R_1$ has one routing rule (2.2.2.0/24, 1.1.1.254). 1.1.1.254 is missing.
$R_2$ has an interface 2.2.2.2 and points to network 2.2.2.0/24.
$R_2$ has one routing rule (1.1.1.0/24, 2.2.2.254). 2.2.2.254 is missing.

Algorithm Run

The calculation of ABIs:

$$ABI_{R_1,1.1.1.254} = 2.2.2.0/24, \quad N_{R_1,1.1.1.254} = 1.1.1.0/24,$$
$$I_{R_1,1.1.1.254} = 1.1.1.1$$

$$ABI_{R_2,2.2.2.254} = 1.1.1.0/24, \quad N_{R_2,2.2.2.254} = 2.2.2.0/24,$$
$$I_{R_2,2.2.2.254} = 2.2.2.2$$

The determining how to link:
Model a virtual router C with interfaces 1.1.1.254 and 2.2.2.254 that connects to 1.1.1.0/24 and 2.2.2.0/24 respectively and contains the routing rules: (1.1.1.0/24, 2.2.2.2) and (2.2.2.0/24, 1.1.1.1).

Router Unification

Instead of creating a virtual router between every two missing next hops in the model, it is possible to create one router that will connect 3 or more missing next hops. The matching algorithm will be the same, but before creating a new virtual router, the algorithm will check if it has already created a virtual router from that next hop and will re-use this virtual router to connect the additional next hop.

Figure 1A:
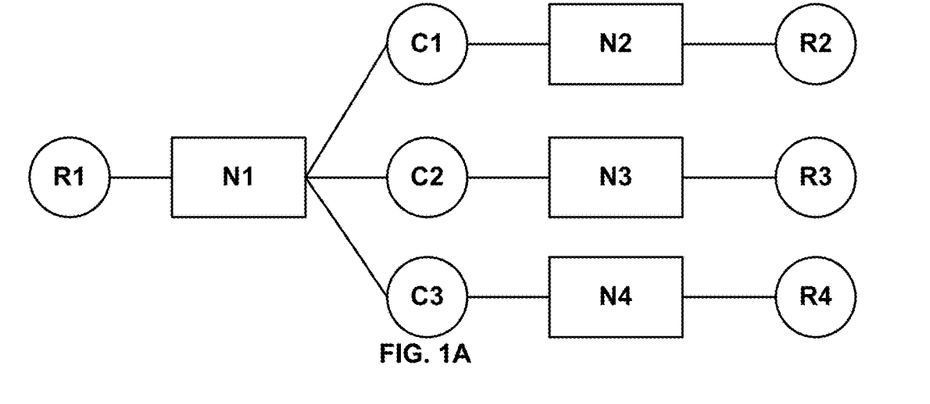
FIG. 1A illustrates an example of artificial network elements and linking between different network elements.

FIG. 1A is an example of merging C1, C2, C3 to one.

Figure 1B:
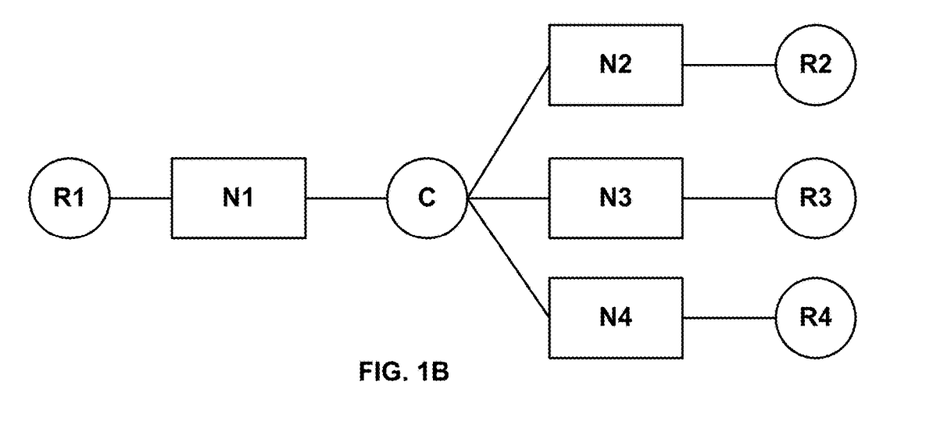
FIG. 1B illustrates an example of artificial network elements and linking between different network elements.

FIG. 1B illustrate creating one router that will connect all these networks.

Default Route Handling

Sometimes, a network device may have a routing rule that directs any traffic that didn't match any of the other routing rules to a next hop. This route is marked as 0.0.0.0/0.

For example, suppose a router has the following routing rules:

1.1.1.0/24, 8.8.8.8
0.0.0.0/0, 9.9.9.9

The rule "0.0.0.0/0, 9.9.9.9" is a default route rule. Any traffic that did not match the first routing rule (1.1.1.0/24, 8.8.8.8) will be directed to 9.9.9.9.

In case the next hop of a default route is missing, special handling is needed. In case only one of the routers in the pair has a default route, this routing rule will be copied as before into the virtual router, as described in step 2 in the algorithm.

However, if both of the routers have default route pointing to the missing next hop, one cannot just copy them into the virtual router because they will create a contradiction—it is unclear which default route to use.

For example: We have two routers with the following routing rules:

| Router A, 8.8.8.1 | Router B, 9.9.9.1 |
|---|---|
| 1.1.1.0/24, 6.6.6.6 (hop exists) | 2.2.2.0/24, 7.7.7.7 (hop exists) |
| 0.0.0.0/0, 8.8.8.8 (missing next hop) | 0.0.0.0/0, 9.9.9.9 (missing next hop) |

Suppose the algorithm connected them on missing next hops 8.8.8.8 and 9.9.9.9 with a virtual router C.

Virtual router C cannot contain two default routes, each pointing to the other direction: 0.0.0.0/0,8.8.8.8, 0.0.0.0/0, 9.9.9.9

Instead, the algorithm will copy all the routing rules not pointing to the missing next hop and point them back to their original router. In addition, a new default route will be added, that points any remaining traffic to "Null", which effectively drops the traffic.

In our example, the following rules will be created:
(A)—1.1.1.0/24, 8.8.8.1
(B)—2.2.2.0/24. 9.9.9.1
(C)—0.0.0.0/0, Null Routing rule (A) is taken from router A and directs back to it because it is not pointing to the missing next hop (8.8.8.8). Similarly, rule (B) is taken from router B and points back at it. Rule (C) is added by default and will drop any traffic not matched by any of the previous routing rules.

Creating routing rules as suggested here will correctly route traffic from A to B and vice versa, but will drop any traffic neither A nor B knows how to route forward.

Simulating MPLS and Other Routing Techniques

Multiprotocol Label Switching (MPLS) is a routing technique used to rapidly route packets between nodes and is typically used within large networks and by ISP.

In essence, MPLS consists of Provider Edge (PE) routers which connect to Provider router (P). Traffic will be directed at a PE, and then will be routed, by the MPLS, into another PE to continue its routing.

Modeling MPLS constructs in a virtual network model is extremely complex.

With the given algorithm, it is possible to achieve the same level of connectivity without the need to simulate the actual MPLS routing.

Figure 1C:
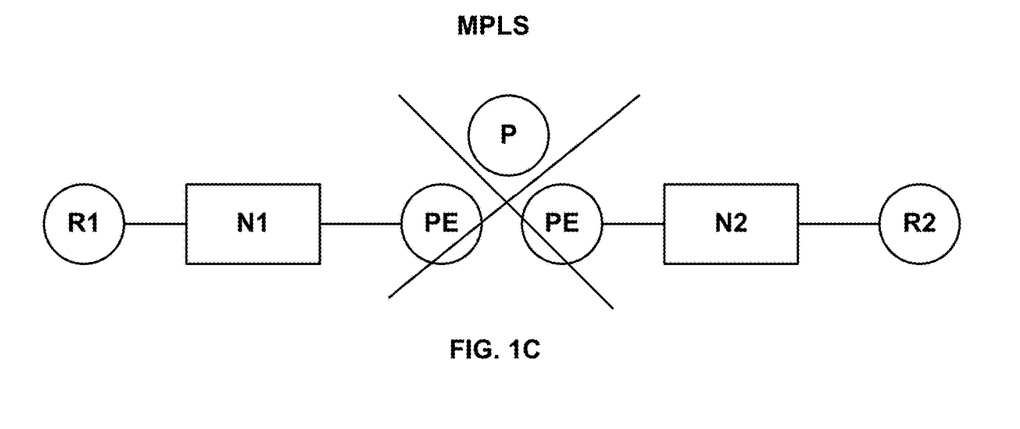
FIG. 1C illustrates an example of ignoring a region of one or more networks.

FIG. 1C illustrates an ignoring the PE of MPLS and consider them as "Missing Next Hop", thus allowing the algorithm to complete them.

It is possible to apply this logic to avoid modeling of other networking algorithms, such as software-defined networking in a wide area network (SD-WAN).

Connecting Assets from Scanners

One of the sources that can be used to create a virtual network model is a vulnerability scanner. Vulnerability scanners are used to scan the various elements connected to a network and to create a list of network elements with their respective IP, network address and list of vulnerabilities.

Vulnerability scanners cannot model the routing rules of the elements they scan. Therefore, in case one models these elements in the virtual model, he will receive a large number of disconnected elements.

Figure 1D:
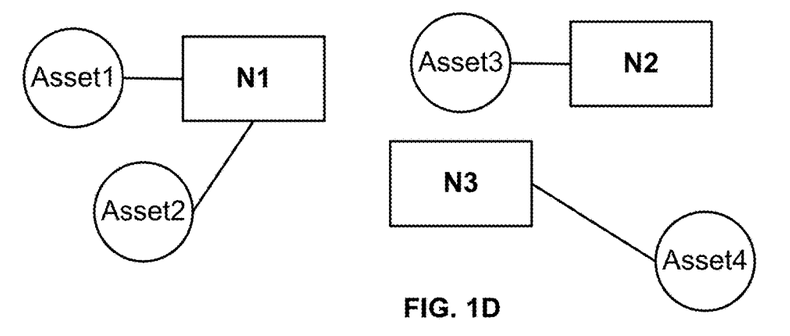
FIG. 1D illustrates an outcome related to a vulnerability scan.

For example—in FIG. 1D a scan has modeled 4 assets. Asset1 and Asset2 are connected to network N1, Asset3 to N2 and Asset4 to N3. Note that the network is disconnected—no way to simulate access from Asset4 to Asset1 for example.

The method cannot be directly applied as is to connect these assets because the assets do not have routing rules, and inherently have no missing next hops. We therefor artificially "invent" a missing next hop for each network that is not connected to any router.

The invented missing next hop will be an IP that belongs to the network but is not used by any of the connected assets to the network. In case all IP addresses in the network are used, the lowest IP will be chosen. The ABI of the network will be all the addresses except the IP addresses of the network.

For example, suppose we have a router A and network with no router 1.1.1.0/24 with one asset 1.1.1.1.

Figure 1E:
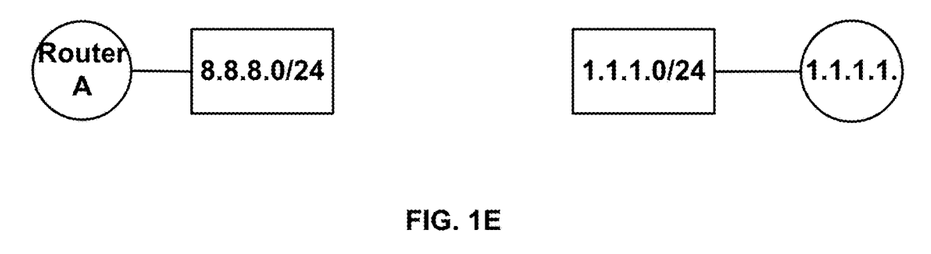
FIGS. 1E-1F illustrate linking a vulnerable assets to a router.

Router A routing rules are: 1.1.1.0/24, 8.8.8.8 (Missing next hop)—see FIG. 1E.

Since the network 1.1.1.0/24 has no router attached to it, we will consider it as if it is connected to a router with a default route pointing to 1.1.1.254. Now we apply the algorithm as before.

Figure 1F:
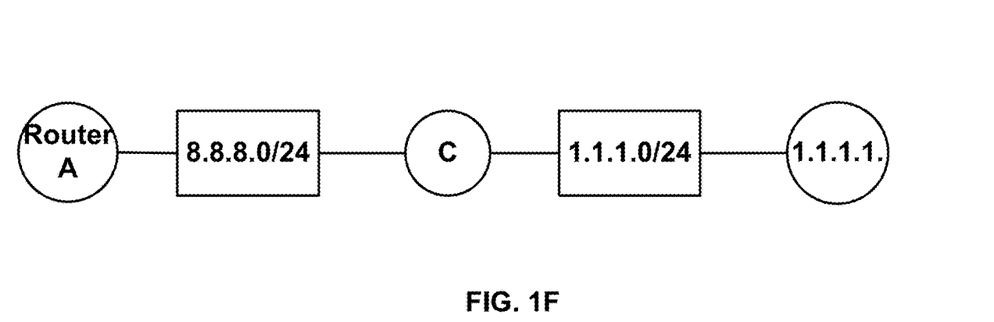

In our example, a virtual router C will be created with two routing rules:
1.1.1.0/24, 1.1.1.254
0.0.0.0/0, 8.8.8.1

Where (A) is coming from router A and (B) is coming from the imagined router connected to 1.1.1.0/24. Thus we get the following connected network—see FIG. 1F.

Figure 2:
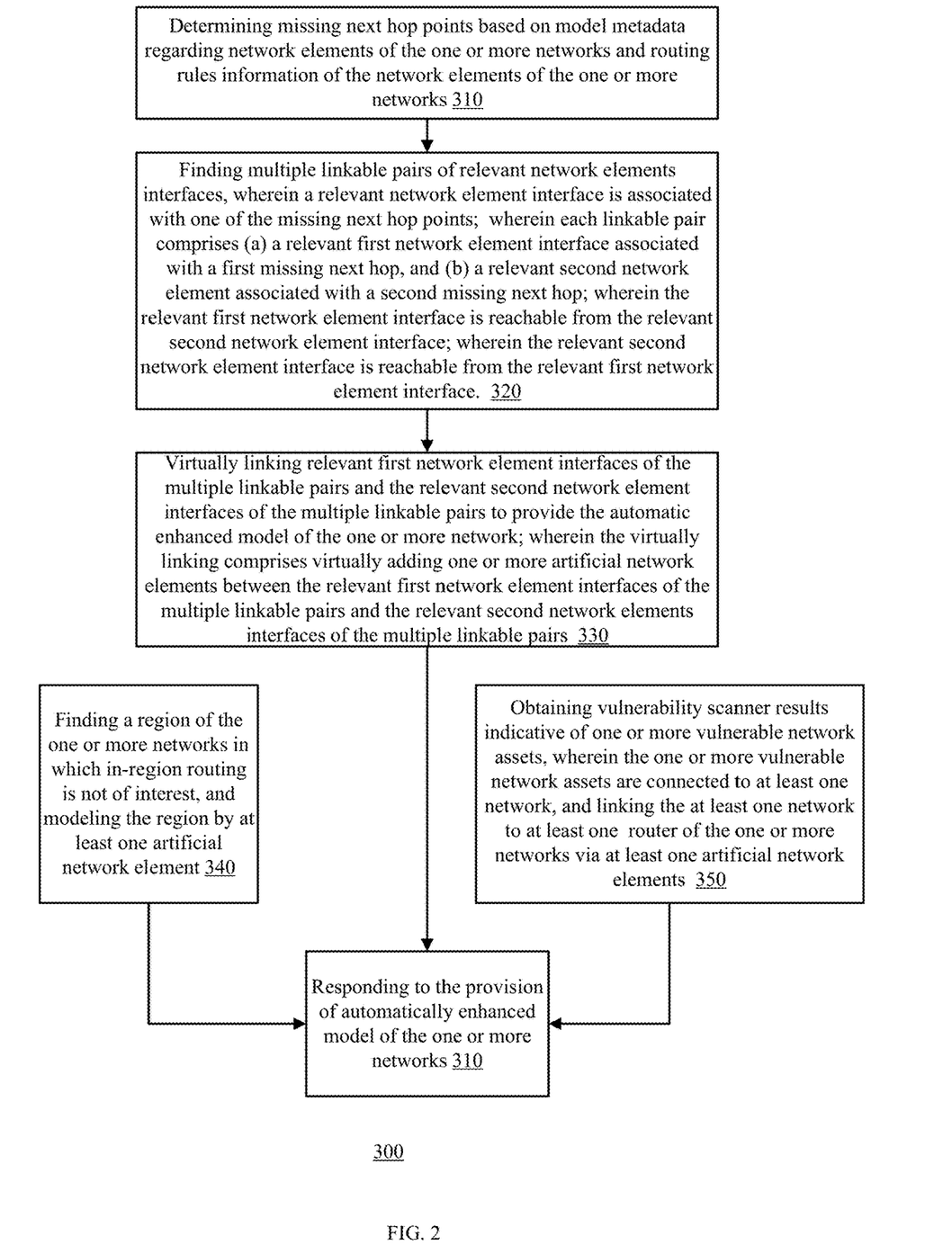
FIG. 2 is an example of a method.

FIG. 2 is an example of method 300 for providing an automatically enhanced model of one or more networks.

Method 300 may include step 310 of determining missing next hop points based on model metadata regarding network elements of the one or more networks and routing rules information of the network elements of the one or more networks.

Step 310 may be followed by step 320 of finding multiple linkable pairs of relevant network elements interfaces, wherein a relevant network element interface is associated with one of the missing next hop points. Each linkable pair includes (a) a relevant first network element interface associated with a first missing next hop, and (b) a relevant second network element associated with a second missing next hop. The relevant first network element interface is reachable from the relevant second network element interface. The relevant second network element interface is reachable from the relevant first network element interface.

The relevant first network element is reachable from the relevant second network element interface when the relevant first network element is included in the ABI of the relevant second network element interface.

The relevant second network element interface is reachable from the relevant first network element interface when the relevant second network element interface is included in the ABI of the relevant first network element interface.

Step 320 may be followed by step 330 of virtually linking relevant first network element interfaces of the multiple linkable pairs and the relevant second network element interfaces of the multiple linkable pairs to provide the automatic enhanced model of the one or more network; wherein the virtually linking comprises virtually adding one or more artificial network elements between the relevant first network element interfaces of the multiple linkable pairs and the relevant second network elements interfaces of the multiple linkable pairs.

The one of more artificial network elements may include routers and switches.

Step 330 may include assigning one artificial network element per linkable pair of the multiple linkable pairs.

Step 330 may include assigning less artificial network elements than a number of the multiple linkable pairs. See for example FIGS. 2A and 2B.

Step 330 may include virtually linking by amending routing rules of one or more relevant network elements interfaces to point to the one or more artificial network elements.

Step 330 may include solving conflicts between routing rules of linked network elements. A conflict occurs when two routing rules route the same destination address to two different or opposite next hops.

The solving of the conflicts may include solving conflicts related to default routing rules of a network elements of a linkable pair that are linked via a single artificial network element. See, for example the section titled "default route handling").

Step 330 may be followed by step 360 of responding to the provision of automatically enhanced model of the one or more networks.

Step 360 may include at least one out of storing the automatically enhanced model of the one or more networks, transmitting the automatically enhanced model of the one or more networks, and determining one or more security parameters of the one or more networks by utilizing the automatically enhanced model of the one or more networks. The one or more security parameters may include vulnerability to attacks, progress of attacks, risk associated with different parts of the one or more networks, estimating potential damages due to attacks, and the like.

Step 360 may include simulating a propagation of an attack through the one or more networks, based on the automatically enhanced model.

Method 300 may include step 340 of finding a region of the one or more networks in which in-region routing is not of interest, and modeling the region by at least one artificial network element. The region may be a multiprotocol label switching (MPLS) network.

Step 340 may be followed by step 360. It may be regarded as another manner to enhance the model of the one or more networks.

Method 300 may include step 350 of obtaining vulnerability scanner results indicative of one or more vulnerable network assets, wherein the one or more vulnerable network assets are connected to at least one network, and linking the at least one network to at least one router of the one or more networks via at least one artificial network elements.

Step 350 may be followed by step 360. It may be regarded as another manner to enhance the model of the one or more networks.

Figure 3:
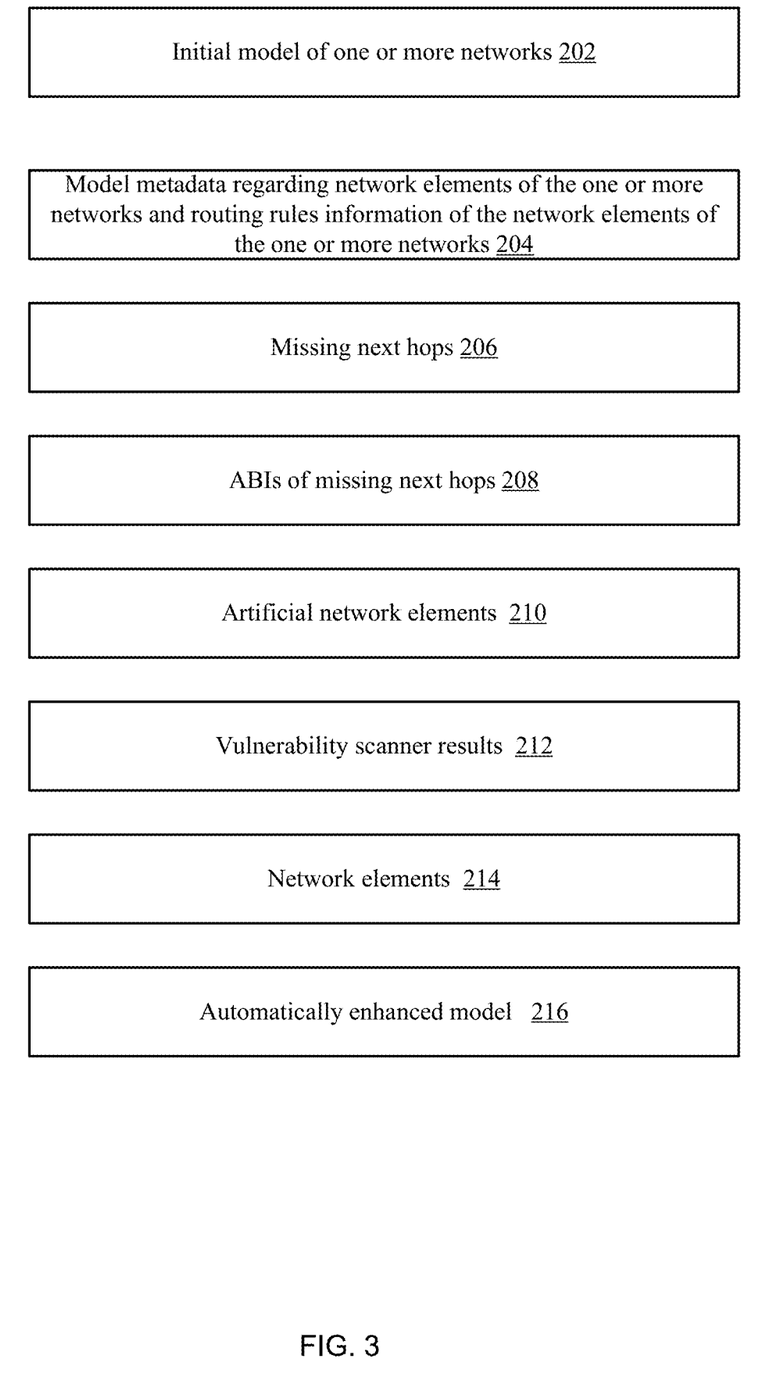
FIG. 3 is an example of data structures.

FIG. 3 illustrates an example of various data structures such as an initial model of the one or more networks 202, model metadata regarding network elements of the one or more networks and routing rules information of the network elements of the one or more networks 204 (may belong to 202), missing next hops 206, ABIs of missing next hops 208, artificial network elements 210, vulnerability scanner results 212, network elements 214 (differ from artificial network elements), and automatically enhanced model 216 (that may include some of the previously mentioned data structures).

Method 300 may be executed by a computerized system and may include memory resources, one or more processing circuits, and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for providing an automatically enhanced model of one or more networks, the method comprises:

determining missing next hop points based on model metadata regarding network elements of the one or more networks and routing rules information of the network elements of the one or more networks; wherein the one or more networks comprise a network that is not connected to any known router and is connected to one or more vulnerable network assets that have no known routing rules; wherein the determining of the missing hops comprises artificially adding a missing next hop to the network;

finding multiple linkable pairs of relevant network elements interfaces, wherein a relevant network element interface is associated with one of the missing next hop points; wherein each linkable pair comprises (a) a relevant first network element interface associated with a first missing next hop, and (b) a relevant second network element associated with a second missing next hop; wherein the relevant first network element interface is reachable from the relevant second network element interface; wherein the relevant second network element interface is reachable from the relevant first network element interface; and virtually linking relevant first network element interfaces of the multiple linkable pairs and the relevant second network element interfaces of the multiple linkable pairs to provide the automatic enhanced model of the one or more network; wherein the virtually linking comprises virtually adding one or more artificial network elements between the relevant first network element interfaces of the multiple linkable pairs and the relevant second network elements interfaces of the multiple linkable pairs.

2. The method according to claim 1 comprising determining one or more security parameters of the one or more networks by utilizing the automatically enhanced model of the one or more networks.

3. The method according to claim 2 wherein the determining comprises a propagation of an attack through the one or more networks, based on the automatically enhanced model.

4. The method according to claim 1 comprising assigning one artificial network element per linkable pair of the multiple linkable pairs.

5. The method according to claim 1 wherein the artificially adding a missing next hop to the network comprises assigning a Internet Protocol (IP) address to the missing next hop that is not used by any asset of the network.

6. The method according to claim 1 wherein the virtually linking comprises amending routing rules of one or more relevant network elements interfaces to point to the one or more artificial network elements.

7. The method according to claim 1 comprising finding a region of the one or more networks in which in-region routing is not of interest, and modeling the region by at least one artificial network element.

8. The method according to claim 7 wherein the region is a multiprotocol label switching (MPLS) network.

9. The method according to claim 1 comprising obtaining vulnerability scanner results indicative of the one or more vulnerable network assets, and linking the at least one network to at least one router of the one or more networks via at least one artificial network element.

10. The method according to claim 1 wherein the virtually linking comprises solving conflicts between routing rules of linked network elements.

11. The method according to claim 10 wherein the solving of the conflicts comprises solving conflicts related to default routing rules of network elements of a linkable pair that are linked via a single artificial network element.

12. The method according to claim 10 wherein the one or more artificial network elements comprises routers, firewalls, switches, load balancers or any other routing capable device.

13. A non-transitory computer readable medium for providing an automatically enhanced model of one or more networks, the non-transitory computer readable medium comprises:
  determining missing next hop points based on model metadata regarding network elements of the one or more networks and routing rules information of the network elements of the one or more networks; wherein the one or more networks comprise a network that is not connected to any known router and is connected to one or more vulnerable network assets that have no known routing rules; where the determining of the missing hops comprises artificially adding a missing next hop to the network;
  finding multiple linkable pairs of relevant network elements interfaces, wherein a relevant network element interface is associated with one of the missing next hop points; wherein each linkable pair comprises (a) a relevant first network element interface associated with a first missing next hop, and (b) a relevant second network element associated with a second missing next hop; wherein the relevant first network element interface is reachable from the relevant second network element interface; wherein the relevant second network element interface is reachable from the relevant first network element interface; and
  virtually linking relevant first network element interfaces of the multiple linkable pairs and the relevant second network element interfaces of the multiple linkable pairs to provide the automatic enhanced model of the one or more network; wherein the virtually linking comprises virtually adding one or more artificial network elements between the relevant first network element interfaces of the multiple linkable pairs and the relevant second network elements interfaces of the multiple linkable pairs.

14. The non-transitory computer readable medium according to claim 13 that stores instructions for determining one or more security parameters of the one or more networks by utilizing the automatically enhanced model of the one or more networks.

15. The non-transitory computer readable medium according to claim 14 wherein the determining comprises a propagation of an attack through the one or more networks, based on the automatically enhanced model.

16. The non-transitory computer readable medium according to claim 13 that stores instructions for assigning one artificial network element per linkable pair of the multiple linkable pairs.

17. The non-transitory computer readable medium according to claim 13 that stores instructions for assigning less artificial network elements than a number of the multiple linkable pairs.

18. The non-transitory computer readable medium according to claim 13 wherein the virtually linking comprises amending routing rules of one or more relevant network elements interfaces to point to the one or more artificial network elements.

19. The non-transitory computer readable medium according to claim 13 that stores instructions for finding a region of the one or more networks in which in-region routing is not of interest, and modeling the region by at least one artificial network element.

20. The non-transitory computer readable medium according to claim 7 wherein the region is a multiprotocol label switching (MPLS) network.

21. The non-transitory computer readable medium according to claim 13 that stores instructions for obtaining vulnerability scanner results indicative of the one or more vulnerable network assets, and linking the at least one network to at least one router of the one or more networks via at least one artificial network element.

22. The non-transitory computer readable medium according to claim 13 wherein the virtually linking comprises solving conflicts between routing rules of linked network elements.

23. The non-transitory computer readable medium according to claim 22 wherein the solving of the conflicts comprises solving conflicts related to default routing rules of network elements of a linkable pair that are linked via a single artificial network element.

24. The non-transitory computer readable medium according to claim 22 wherein the one or more artificial network elements comprises routers, firewalls, switches, load balancers or any other routing capable device.

* * * * *